(12) United States Patent
Wang et al.

(10) Patent No.: US 9,989,704 B2
(45) Date of Patent: Jun. 5, 2018

(54) DIGITAL DISPERSION COMPENSATION MODULE

(71) Applicants: Tongqing Wang, Newark, CA (US); Dobby Lam, Dublin, CA (US); Jinghui Li, Sierra Madre, CA (US); Ming Ding, Bellevue, WA (US)

(72) Inventors: Tongqing Wang, Newark, CA (US); Dobby Lam, Dublin, CA (US); Jinghui Li, Sierra Madre, CA (US); Ming Ding, Bellevue, WA (US)

(73) Assignee: LUXAR TECH INC, Fremont, CA (US)

( * ) Notice: Subject to any disclaimer, the term of this patent is extended or adjusted under 35 U.S.C. 154(b) by 0 days. days.

(21) Appl. No.: 15/194,474

(22) Filed: Jun. 27, 2016

(65) Prior Publication Data
US 2017/0336567 A1      Nov. 23, 2017

Related U.S. Application Data

(63) Continuation-in-part of application No. 14/120,689, filed on Jun. 17, 2014, now Pat. No. 9,817,189.
(Continued)

(51) Int. Cl.
    *G02B 6/26*         (2006.01)
    *G02B 6/42*         (2006.01)
    (Continued)

(52) U.S. Cl.
    CPC ......... *G02B 6/268* (2013.01); *G02B 6/02076* (2013.01); *G02B 6/29317* (2013.01);
    (Continued)

(58) Field of Classification Search
    CPC .... G02B 6/268; G02B 6/02076; G02B 6/356; H04B 10/07951; H04B 10/2519; H04L 45/22; H04Q 11/0005; H04Q 11/0066
    (Continued)

(56) References Cited

U.S. PATENT DOCUMENTS 5,602,666 A    2/1997  Ishikawa et al.
6,865,311 B2   3/2005  Li
(Continued)

OTHER PUBLICATIONS

Office Action dated Jan. 20, 2017 of U.S. Appl. No. 14/120,698.
Office Action dated Jul. 20, 2016 of U.S. Appl. No. 14/120,698.

*Primary Examiner* — Jerry Blevins

(57) ABSTRACT

Embodiments of present invention provide a digital dispersion compensation module. The digital dispersion compensation module includes a multi-port optical circulator and a plurality of dispersion compensation units connected to the multi-port optical circulator, wherein at least one of the plurality of dispersion compensation units includes a first and a second reflectively terminated element and an optical switch being capable of selectively connecting to one of the first and second reflectively terminated elements, and wherein the at least one of the plurality of dispersion compensation units is adapted to provide a substantially zero dispersion to an optical signal, coming from the multi-port optical circulator, when the optical switch connects to the first reflectively terminated element and is adapted to provide a non-zero dispersion to the optical signal when the optical switch connects to the second reflectively terminated element.

14 Claims, 8 Drawing Sheets

Related U.S. Application Data

(60) Provisional application No. 61/957,352, filed on Jul. 1, 2013.

(51) Int. Cl.
*G02B 6/35* (2006.01)
*G02B 6/293* (2006.01)
*G02B 6/02* (2006.01)
*H04Q 11/00* (2006.01)

(52) U.S. Cl.
CPC ......... *G02B 6/29392* (2013.01); *G02B 6/356* (2013.01); *H04Q 11/0005* (2013.01); *H04Q 11/0062* (2013.01); *H04Q 2011/0022* (2013.01); *H04Q 2011/0081* (2013.01); *H04Q 2011/0083* (2013.01)

(58) Field of Classification Search
USPC .................................................... 385/21, 22
See application file for complete search history.

(56) References Cited

U.S. PATENT DOCUMENTS

| | | | |
|---|---|---|---|
| 7,263,257 B2* | 8/2007 | Sugden | G02B 6/12007 385/1 |
| 2002/0159672 A1* | 10/2002 | Fells | G02B 6/2932 385/13 |
| 2003/0128920 A1 | 7/2003 | Way | |
| 2005/0220409 A1 | 10/2005 | Guerin | |
| 2011/0052198 A1 | 3/2011 | Ohtani | |
| 2011/0205531 A1 | 8/2011 | Ohtani | |
| 2015/0043917 A1 | 2/2015 | Simonneau et al. | |

* cited by examiner

DIGITAL DISPERSION COMPENSATION MODULE

CROSS REFERENCE TO RELATED APPLICATION

This is a continuation-in-part application of U.S. patent application Ser. No. 14/120,689, entitled "Digital dispersion compensation module", filed Jun. 17, 2014, which claims benefit of priority to a provisional U.S. patent application Ser. 61/957,352, filed Jul. 1, 2013.

FIELD OF THE INVENTION

The present invention relates generally to configuration and structure of devices and modules for optical digital signal transmission and transportation and, in particular, relates to digital dispersion compensation modules.

BACKGROUND

Optical signal transmission and transportation is a key enabler and driving force in today's high speed digital communication infrastructure that supports vast amount of data transportation essential for many data centric informational applications such as, for example, internet application. With ever increasing demand for transportation bandwidth, new systems of optical signal transmission and transportation are constantly being developed that trend toward providing higher digital data rate and higher channel density count.

A digital optical signal, in a format of binary or multi-level, usually experiences certain amount of distortion during transportation that, together with other factors such as noise, affects overall system performance. Generally, the higher the data rate and the longer the distance travelled by the optical signal, the bigger amount of distortion that the optical signal experiences. Among many factors contributing to the optical signal distortion, chromatic dispersion of the transportation media such as optical fiber is a major contributor. The amount of dispersion that an optical signal may be able to tolerate in a transportation system varies inversely proportional to the square of the data rate. As a general rule of thumb, for a 40 Gb/s direct detection system, the dispersion window, within which system performance variation is tolerable, is typically less than the equivalent of a piece of 10 km SMF-28 fiber measured at 1550 nm wavelength.

FIG. 1 is a simplified functional block diagram of an optical signal transportation system with line protection scheme as is known in the art. Under normal working conditions, optical signals are transported over working fiber pair such as paths 31 and 32, as a bidirectional optical transportation system 1, between terminal 10 and terminal 20. When there is a fault such as fiber cut in one or both of the working fiber paths 31 and 32, the amount of optical signal received at photo-detector PD2 in terminal 10 and/or at photo-detector PD5 in terminal 20 will generally decrease to a level below a pre-defined threshold. As a result, this decrease in received signal level triggers optical line protection (OLP) switches, such as SW1 and SW2 in terminal 10 and SW3 and SW4 in terminal 20, to switch and cause the system to transmit and receive optical signals via protection fiber pair such as paths 41 and 42, replacing working fiber paths 31 and 32. The same event, such as fiber cut, may also trigger the generation of a system alarm to alert the happening and existence of such fault in the working fiber paths 31 and 32. Optical signals transported over protection fiber paths 41 and 42 may continue to provide data service and be monitored by photo-detectors PD3 and PD6 while working fiber paths 31 and 32 are being repaired or restored. In the bidirectional optical transportation system 1 illustrated in FIG. 1, photo-detectors PD1 and PD4 are used to monitor optical signal levels launched into the fibers, in both directions.

However, configuration of the above optical system may not work well, where the system has a narrow dispersion tolerance window, due to difference in total fiber link dispersion between the working fiber path 31 or 32 and the protection fiber path 41 or 42, respectively. This is especially true in a DQPSK system where data rate of the optical signal is generally high, around 40 Gb/s or higher. Generally in the above system, in order to expand dispersion window that the optical signal and system are able to withstand, fiber-Bragg gratings (FBG) and more frequently Etalon-based channelized tunable dispersion compensation modules (TDCM), both of which are not shown in FIG. 1, are used at the receiving end of each channels of their respective terminals to bring down the total net dispersion.

In order to get the optical transportation system back to work or recovered, the tunable dispersion compensation module (TDCM) in each receiving channel is required to change or modify their dispersion setting so as to compensate any difference in the amount of dispersion between the working and the protection fiber paths. However, dispersion of this narrow band channelized TDCM is normally tuned through gradual temperature change which is usually in the range of seconds, if not in the tens of seconds. Together with the process of using forward error correction (FEC) feedback or other feedback mechanism to find the right setting for the TDCM, the entire process of recovering the transportation system from fiber cut for just one channel, for example, may take several seconds and sometimes close to tens of seconds and is thus considered slow from a system standpoint. It is known in the industry that for dynamic line protection application, it is generally required that the system recovery time be less than 50 ms. Obviously, the above thermally-tuned TDCM is unable to meet the 50 ms system recovery time requirements for the protection scheme of an optical transmission and transportation system.

SUMMARY

Embodiments of present invention provide a digital dispersion compensation module (DDCM). The DDCM includes a multi-port optical circulator and a plurality of dispersion compensation units connected to the multi-port optical circulator, wherein at least one of the plurality of dispersion compensation units includes a first and a second reflectively terminated element; and an optical switch being capable of selectively connecting to one of the first and second reflectively terminated elements, and wherein the at least one of the plurality of dispersion compensation units is adapted to provide a substantially zero dispersion to an optical signal, coming from the multi-port optical circulator, when the optical switch connects to the first reflectively terminated element and is adapted to provide a non-zero dispersion to the optical signal when the optical switch connects to the second reflectively terminated element.

In one embodiment, each of the plurality of dispersion compensation units is configurable to selectively provide the substantially zero dispersion or the non-zero dispersion within 50 ms, with value of the non-zero dispersion provided by each of the plurality of dispersion compensation units being different.

In a further embodiment, value of the non-zero dispersion provided by each of the plurality of dispersion compensation units, except a minimum value one thereof, is twice of value of the non-zero dispersion provided by another dispersion compensation unit of the plurality of dispersion compensation units.

In one embodiment, the non-zero dispersion is a positive dispersion, and in another embodiment, the non-zero dispersion is a negative dispersion.

In one embodiment, at least one of the plurality of dispersion compensation units is a transmission-type dispersion compensation unit having a first port and a second port, with one of the first and second ports being an input port or an output port of the DDCM.

In one embodiment, the first reflectively terminated element is selected from a group consisting of a reflectively coated mirror, a reflective thin-film filter, and a piece of fiber reflectively terminated at one end.

In another embodiment, the second reflectively terminated element is a dispersive fiber of certain length being reflectively coated at one end or a reflective fiber-Bragg grating, being capable of providing the non-zero dispersion to the optical signal over a continuous bandwidth of at least 35 nm in either a C-band of 1530-1565 nm or a L-band of 1565-1625 nm of optical signal spectrum.

Embodiments of present invention also provide a dispersion compensation unit, which includes a first and a second element and an optical switch element being capable of selectively connecting to the first element or the second element to provide a substantially zero dispersion or a non-zero dispersion, respectively, to an optical signal entering the dispersion compensation unit via the optical switch.

BRIEF DESCRIPTION OF THE DRAWINGS

The present invention will be understood and appreciated more fully from the following detailed description of embodiments of the invention, taken in conjunction with accompanying drawings of which.

Figure 1:
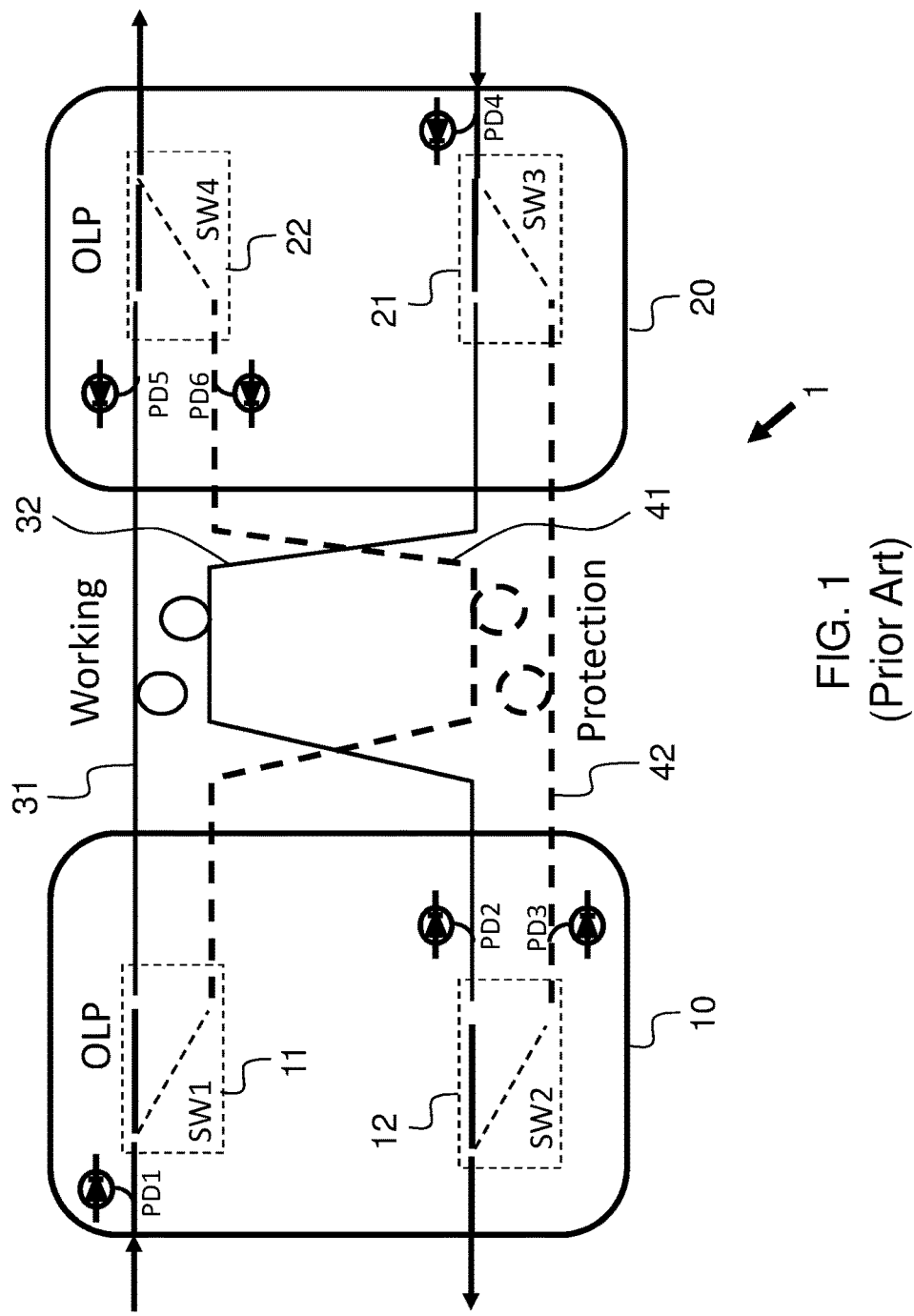
FIG. 1 is a simplified functional block diagram of optical signal transportation system with optical line protection scheme as is known in the art.

It will be appreciated that for simplicity and clarity purpose, elements shown in the drawings have not necessarily been drawn to scale. Further, in various functional block diagrams, two connected devices and/or elements may not necessarily be illustrated to be connected, for example, by a continuous solid line or dashed line but rather sometimes a small gap between two lines extended from the two devices and/or elements may be inserted intentionally in order to illustrate the individual devices and/or elements even though their connection is implied. In some other instances, grouping of certain elements in a functional block diagram may be solely for the purpose of description and may not necessarily imply that they are in a single physical entity or they are embodied in a single physical entity.

DETAILED DESCRIPTION OF PREFERRED EMBODIMENTS

Figure 2:
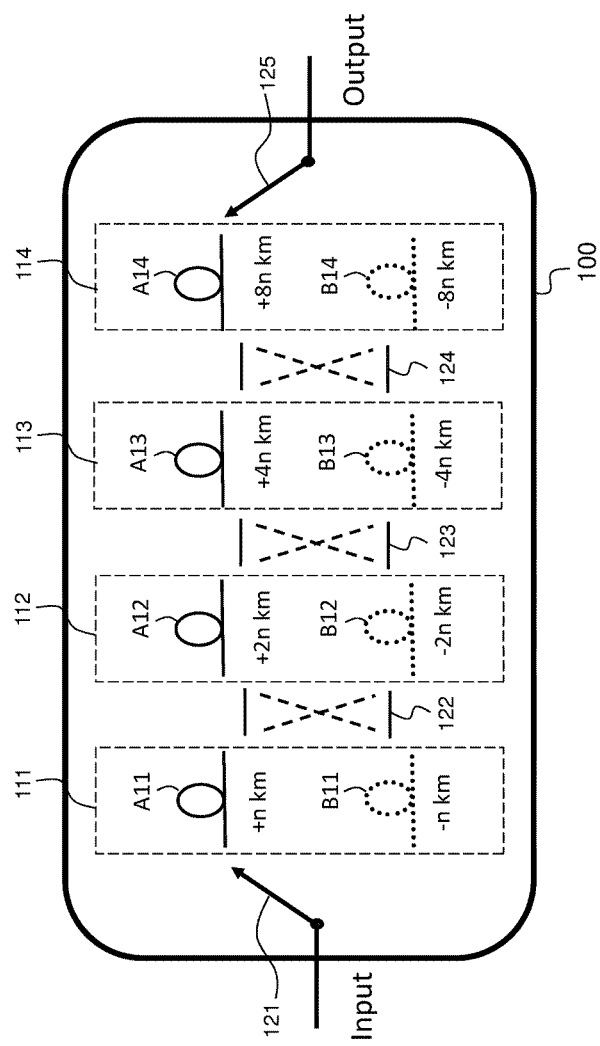
FIG. 2 is a demonstrative illustration of functional block diagram of a transmission-type optical digital dispersion compensation module according to one embodiment of present invention.

FIG. 2 is a demonstrative illustration of functional block diagram of a transmission-type optical digital dispersion compensation module according to an embodiment of present invention. In particular, digital dispersion compensation module (DDCM) 100 may include a plurality of dispersion compensation units that are connected in a series by a set of optical switches. For example, in the embodiment illustrated in FIG. 2, DDCM 100 may start with a first optical switch (OSW) 121; the first OSW 121 is then connected to a first dispersion compensation unit (DCU) 111; the first DCU 111 is then connected to a second OSW 122; the second OSW 122 is then connected to a second DCU 112; the second DCU 112 is then connected to a third OSW 123; the third OSW 123 is then connected to a third DCU 113; the third DCU 113 is then connected to a fourth OSW 124; the fourth OSW 124 is then connected to a fourth DCU 114; and finally the fourth DCU 114 is connected to a fifth OSW 125 to finish DDCM 100. However, a person skilled in the art will appreciate that embodiments of present invention are not limited in the above aspect and DDCM 100 may include more or less OSW's and DCU's that are serially connected as being described above. For example, according to specific requirement for optical signal transportation, including range of dispersion to be compensated and/or the granularity of compensation needed, DDCM 100 may include more DCU's and correspondingly more OSW's.

Optical switches 121 and 125 may serve partially as input and output ports of DDCM 100 and may be one-by-two (1×2) type optical switches or any optical switches that provide 1×2 signal connectivity. For example, optical switch 121 may have one input port and two output ports and similarly optical switch 125 may have two input ports and one output port. According to one embodiment, optical switches 122, 123, and 124 may be two-by-two (2×2) type optical switches or any optical switches that provide 2×2 signal connectivity, having two input ports and two output ports respectively, which are configured and electronically controlled to be at either a straight through position (solid lines in FIG. 2) or a cross-over position (dot lines in FIG. 2), as being demonstratively illustrated in FIG. 2. Since optical switches 121, 122, 123, 124, and 125 are all electronically controlled, a short response time, which is important for system application, of less than 50 ms and typically less than 10 ms is generally achieved.

Dispersion compensation units 111, 112, 113, and 114 may each be able to provide a base amount, or preferably a certain integer multiple thereof, of dispersion compensation to an input optical signal. The dispersion compensated may be either positive or negative, and may be broadband across a wide wavelength range. For example, the wavelength range covered may range from 1260 nm to 1680 nm, preferably from 1510 nm to 1630 nm, and more preferably from 1530 nm to 1565 nm although other wavelength ranges or bands, wider or narrower, are fully contemplated as well. In other words, DCUs 111, 112, 113 and 114 may be able to provide adequate amount of dispersion compensation for dense WDM (DWDM) systems across multiple wavelength bands including, for example, O-band of 1260-1360 nm, E-band of 1360-1460 nm, S-band of 1460-1530 nm, C-band of 1530-1565 nm, L-band of 1565-1625 nm, and/or U-band of 1625-1675 nm. Further for example, dispersion compensation units 111, 112, 113, and 114, and DDCM 100 configured thereby, may be able to provide adequate dispersion compensation for a wideband signal which may carry an extreme high data rate. Such wideband signal may include, as a non-limiting example, a single wavelength 100 Gb/s direct detection transmission digital signal with PAM4 at the symbol rate of 50 Gb/s. Such multi-level modulation scheme may particularly be used with the advance of silicon photonics technology. In yet one embodiment, as being described below in more details with reference to FIG. 6, one or more of the dispersion compensation units may provide a substantially zero dispersion using a non-dispersive element.

The base amount of dispersion compensation given by DDCM 100 is determined by the granularity of compensation required by its particular system application, which is often affected and/or determined by, among others, the rate of digital optical signal such as whether the digital optical signal to be compensated is a 10 Gb/s or a 40 Gb/s optical signal. Furthermore, assuming DCU 111 is designed to provide the base amount of dispersion compensation (both positive and negative), equivalent in value to a piece of SMF-28 fiber of n km in length, wherein n may be any suitable number (or non-integer value), having a dispersion amount of y ps/nm/km measured at a particular wavelength such as 1550 nm, DCU 112, 113, and 114 may preferably be designed to provide dispersions equivalent to $2^i \times n$ km of the same SMF-28 fiber where i=1, 2, and 3. As being illustrated in FIG. 2, each DCU has four ports with two input ports, one for positive and one for negative dispersion compensation, and two output ports for the signal to exit the DCU. The four ports are connected respectively to two optical switches, one at the input side and one at the output side.

More specifically, as a particular non-limiting example illustrated in FIG. 2, DCU 111 may include a positive dispersion element A11 and a negative dispersion element B11; DCU 112 may include a positive dispersion element A12 and a negative dispersion element B12; DCU 113 may include a positive dispersion element A13 and a negative dispersion element B13; and DCU 114 may include a positive dispersion element A14 and a negative dispersion element B14. The dispersion value of elements A11, A12, A13, and A14 may be doubled sequentially, that is, A12 is twice as much as A11; A13 is twice as much as A12; and A14 is twice as much as A13 in the amount of dispersion. Similarly, absolute dispersion value of dispersion element B11, B12, B13, and B14 may be doubled sequentially as well with B14 has eight times dispersion as that of B11. In the meantime, value of dispersion of A11 is the same as value of B11, so is A12 and B12, A13 and B13, and A14 and B14. The dispersion elements A11, A12, A13, A14 and B11, B12, B13 B14 may be constructed from distributed waveguides such as dispersion compensation fiber (DCF), dispersion shifted fiber (DSF), single mode fiber (SMF) such as SMF-28, fiber-Bragg grating (FBG), or other discrete resonators such as Etalon-based Fabry-Perot resonator or a ring-resonator, to list a few for wideband use.

By setting optical switches 122-124 at either straight through or cross-over position individually, the total equivalent dispersion value that DDCM 100 may be able to provide ranges from −15n km to +15n km of SMF-28 fiber with an incremental step of 2n km. Therefore, when being used in a fiber-optic link that has a total dispersion equivalent to a piece of SMF-28 fiber ranging from −16n km to +16n km, the fiber-optic link may be compensated by DDCM 100 to have a final net dispersion within +/−n km, which dramatically reduce the required tolerance range of the transmitting and/or receiving devices communicating through the fiber-optic link.

It is to be noted that the above configuration of DDCM 100 may be generalized to include a dispersion compensation module having N dispersion compensation units cascaded by N+1 optical switches, with N being any suitable integer number (for example, N=4 for DDCM 100 illustrated in FIG. 2). Each dispersion compensation unit k (k=1, 2, . . . N) may be able to selectively provide either a positive or a negative dispersion with a value equivalent to $2^{(k-1)} \times n$ km SMF-28 fiber. The N dispersion compensation units may be cascaded randomly, in an ascending order, or in a descending order in terms of dispersion value they provide. A total range of dispersion compensation provided by DDCM 100 may be from $-(2^N-1) \times n$ km to $+(2^N-1) \times n$ km, capable of adjusting a fiber-optic link of total equivalent dispersion value no more than $+/-2^N \times n$ km down to a range of +/−n km. With the incremental and discrete nature of dispersion adjustment, a dispersion compensation module based upon the above scheme of N cascaded dispersion compensation units is referred to herein as a digital dispersion compensation module (DDCM).

The dispersion compensation units (DCUs) illustrated in FIG. 2 each includes a positive dispersion element and a negative dispersion element of a same value. Each dispersion element has one input port and one output port, making up a total two input ports and two output ports of the DCU. An optical signal may enter an input port of one of the two dispersion elements, based upon how the DCU is connected to a connecting optical switch, and exits from a corresponding output port of that dispersion element. A DDCM with an optical signal going through an input and an output port of each of the dispersion compensation units, as being described above, may be referred to hereinafter as a transmission-type DDCM.

It is to be noted that in the above description, DDCM 100 is illustrated as an example to have four dispersion compensation units cascaded by three 2×2 optical switches with additional two 1×2 optical switches respectively at the input and output port of the DDCM. However, embodiments of present invention are not limited in this aspect. For example, other types of optical switches may be used to replace the 2×2 optical switches in cascading the four dispersion compensation units. For example, two 1×2 optical switches connected back-to-back may be used to provide the same connectivity as one 2×2 optical switch in the DDCM configuration shown in FIG. 2. Other optical switches with more than two input and/or output ports may be used as well. Moreover, one or more of the four dispersion compensation units may be described to include some or a portion of the cascading optical switch or switches. Variations of the above are fully contemplated herein to be within the spirit of present invention.

Figure 3:
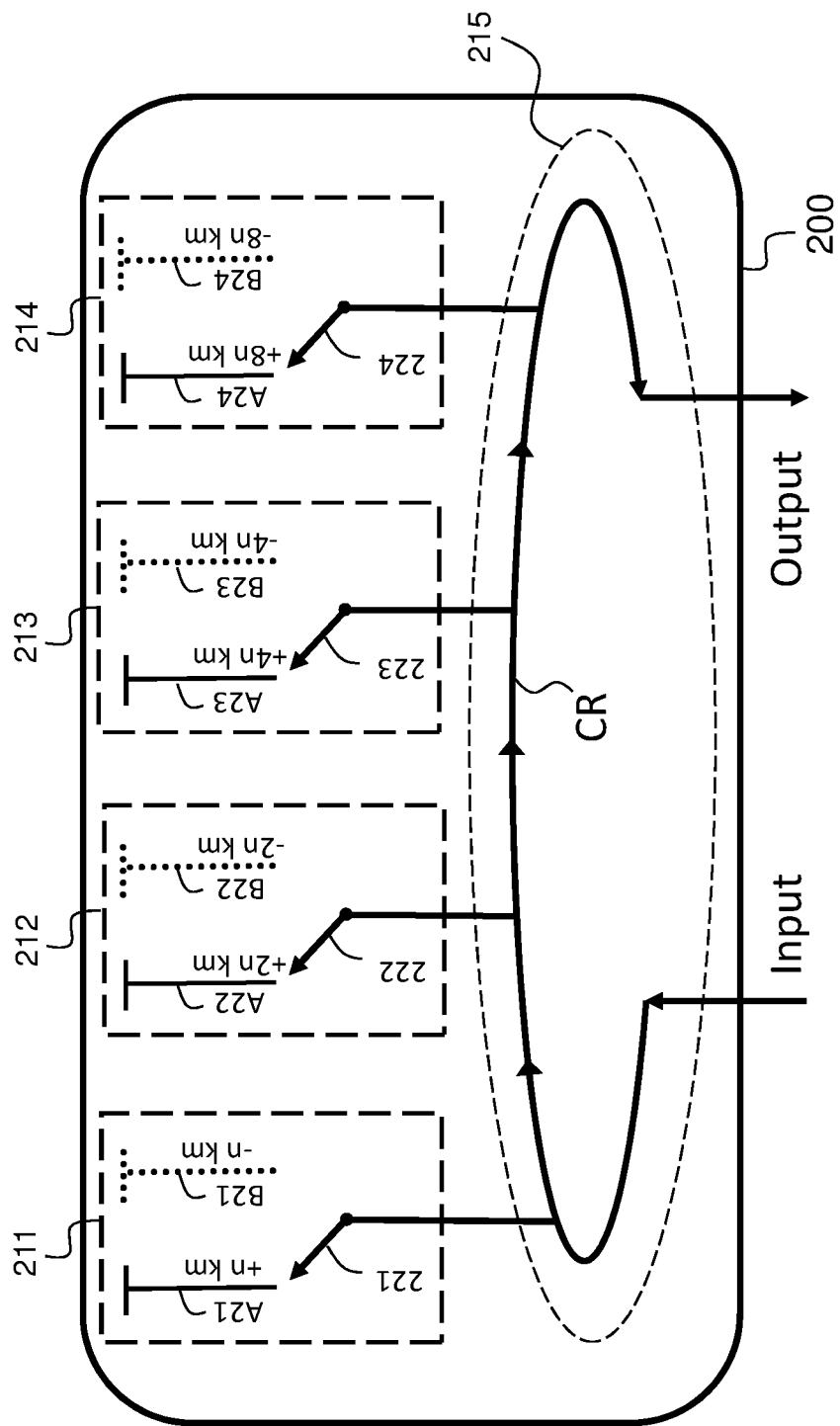
FIG. 3 is a demonstrative illustration of functional block diagram of a reflective-type optical digital dispersion compensation module according to another embodiment of present invention.

FIG. 3 is a demonstrative illustration of functional block diagram of a reflective-type optical digital dispersion compensation module according to another embodiment of present invention. For example, DDCM 200 may include four dispersion compensation units 211, 212, 213, and 214 that are connected to a multi-port optical circulator such as a 6-port optical circulator 215. In one embodiment, the 6-port optical circulator may be constructed from cascaded optical circulators with lower number of ports such as two or more 3-port or 4-port optical circulators, as being discussed below in more details with reference to FIG. 8.

In FIG. 3, dispersion compensation units 211, 212, 213, and 214 may each include a positive dispersion element, a negative dispersion element, and an optical switch being capable of selectively connecting to one of the positive dispersion element and the negative dispersion element. For example, DCU 211 may include a positive dispersion element A21, a negative dispersion element B21, and an optical switch 221 connected to either A21 or B21; DCU 212 may include a positive dispersion element A22, a negative dispersion element B22, and an optical switch 222 connected to either A22 or B22; DCU 213 may include a positive dispersion element A23, a negative dispersion element B23, and an optical switch 223 connected to either A23 or B23; and DCU 214 may include a positive dispersion element A24, a negative dispersion element B24, and an optical switch 224 connected to either A24 or B24. Optical switches 221, 222, 223, and 224 may be, for example, one-by-two (1×2) optical switches which is connected to either the positive dispersion element or the negative dispersion element inside their respective dispersion compensation unit. The optical switches may be electronically controlled such that a fast response time of less than 50 ms and most likely less than 10 ms may be achieved. In one embodiment a non-dispersive element may be used, rather the positive (or negative) dispersion element, if the dispersion compensation unit is designed to provide by-pass functionality in terms of dispersion, as being described below in more details with reference to FIG. 6.

Alternatively, optical switches 221, 222, 223, and 224 may be considered or described as residing outside of DCU 211, 212, 213, and 214 and are used in connecting DCU 211, 212, 213, and 214 to their respective ports of multi-port optical circulator 215, in which case DCU 211, 212, 213, and 214 may be considered as only including one positive dispersion element and one negative dispersion element. It is to be noted that other types of description or categorization of individual elements inside DCMM 200 may be possible and are fully contemplated, and all of which are considered herein as being within the spirit of present invention. Nevertheless, in the below description, for simplicity of description without losing generality, DCU 211, 212, 213, and 214 are considered to include optical switches 221, 222, 223, and 224, respectively.

In DDCM 200, dispersion elements A21, A22, A23 and A24 are all single-port positive dispersion elements with their dispersion values, except a minimum one, being at least twice as much as another, as being demonstratively illustrated in the block diagram FIG. 3. For example, A22 may have twice as much dispersion as A21; A23 may have twice as much dispersion as A22; and A24 may have twice as much dispersion as A23. Similarly, dispersion elements B21, B22, B23, and B24 are all single port negative dispersion elements as well with their dispersion values, negative in sign, being at least twice as much as another except a minimum one, similar to the relationship among A21, A22, A23, and A24. Preferably, within each dispersion compensation unit, the positive dispersion element and the negative dispersion element have the same or substantially same amount of dispersion value.

Both the positive and the negative dispersion elements inside a dispersion compensation unit may be constructed from distributed waveguides such as DCF, DSF, or SMF fibers, in which case one end of the DCF, DSF, or SMF fiber may be reflectively terminated by for example an optically coated mirror. The dispersion element may also be constructed from fiber-Bragg grating (FBG) or other discrete components including, but not limited to, a Fabry-Perot Etalon-based cavity or a ring-resonator. Below for description purpose, the use of dispersive fiber is assumed.

By connecting each of the optical switches 221, 222, 223, and 224 to either the positive or the negative dispersion elements inside their respective dispersion compensation units, the total dispersion value that may be provided by DDCM 200 varies from that of equivalent −15n km to +15n km of SMF-28 fiber with an incremental step of 2n km. Therefore, for any fiber link with a total dispersion within an equivalent range from −16n km to +16n km of SMF-28 fiber, the fiber link may be compensated by DDCM 200 to have a net dispersion within the equivalent of +/−n km of SMF-28 fiber. Similar to DDCM 100 illustrated in FIG. 2, DDCM 200 may be generalized to be a DDCM having N dispersion compensation units connected to a N+2-port optical circulator (or a chain of optical circulators). Each dispersion compensation unit k (k=1, 2, . . . N) may have a dispersion value equivalent to $2^{(k-1)} \times n$ km of SMF-28 fiber, both positive and negative, and the N dispersion compensation units may be connected to optical circulator 215 in the order of k=1, 2, . . . N, or in any other random order. A total range of dispersion compensation provided by this DDCM 200 may be an equivalent value from $-(2^N-1) \times n$ km to $+(2^N-1) \times n$ km of SMF-28 fiber, within an achievable residual dispersion range of +/−n km. As being described above, both the positive and the negative dispersion elements in DDCM 200 are a single port element. An optical signal may enter into a dispersion element from optical circulator 215 via the optical switch inside the DCU; get reflected back at the other end of the dispersion element to return back to optical circulator 215; propagate to the next port of optical circulator 215; and enter into a dispersion element of the next DCU or exit DCMM 200 through optical circulator 215. The dispersion elements may be constructed through a two-port element by terminating the second port with a reflective mirror. The optical signal experiences twice the dispersion value when being reflected back by the reflective mirror and going through the same dispersion element twice. A DDCM with this type of reflective-type dispersion elements are referred to, hereinafter, as a reflective-type DDCM.

Similar to DDCM 100, dispersion compensation units 211, 212, 213, and 214 may be able to provide a base amount, or an integer multiple thereof, of dispersion compensation to an input optical signal as being described above. The dispersion compensated may be positive or negative, and may be broadband across a wide wavelength range. For example, the covered wavelength range may be from 1260 nm to 1680 nm, preferably from 1510 nm to 1630 nm, and more preferably from 1530 nm to 1565 nm although other wavelength ranges or bands, wider or narrower, are fully contemplated as well. In one embodiment, the covered wavelength range may include at least O-band of 1260-1360 nm, E-band of 1360-1460 nm, S-band of 1460-1530 nm, C-band of 1530-1565 nm, L-band of 1565-1625 nm, and/or U-band of 1625-1675 nm.

Figure 4:
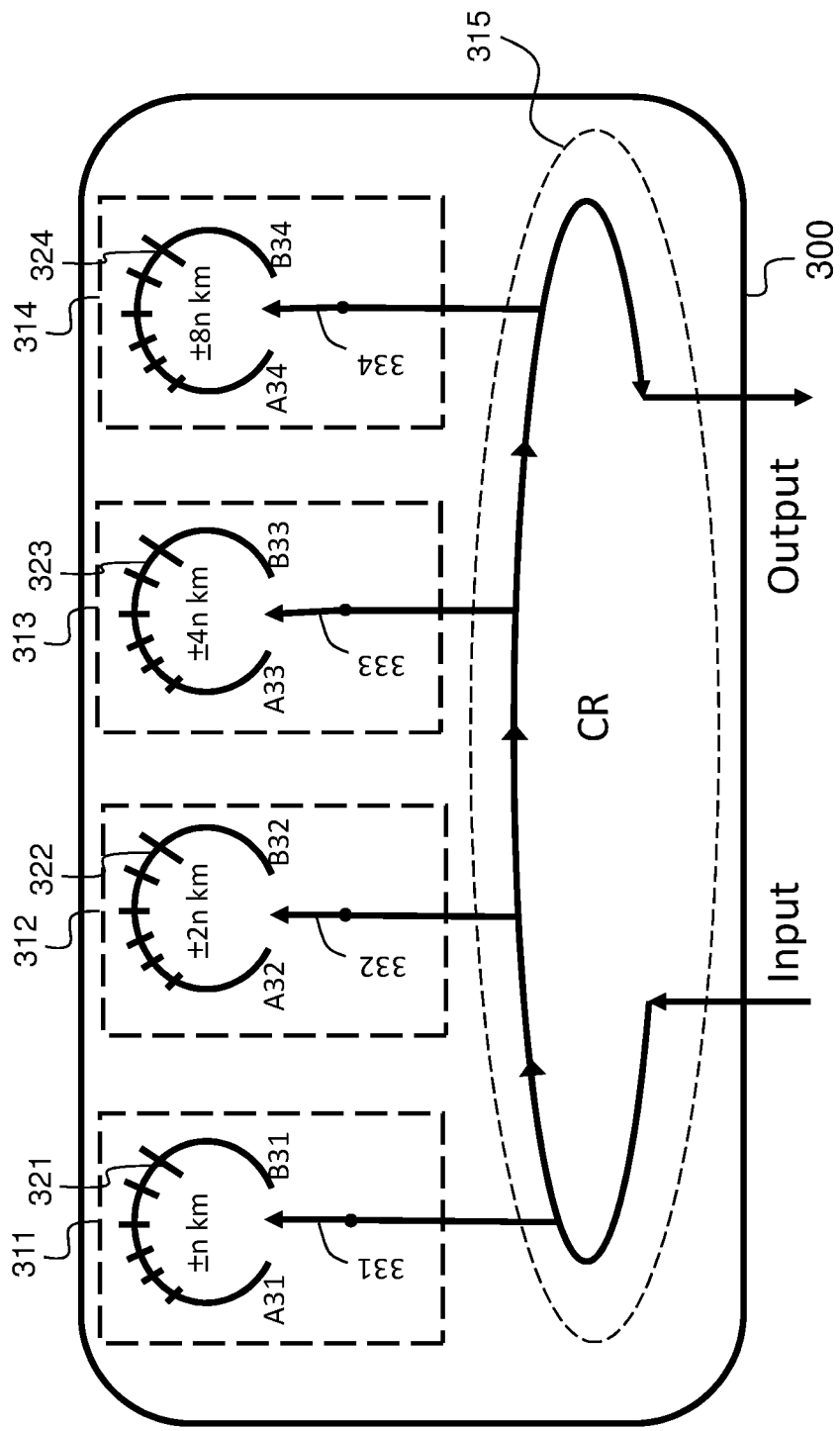
FIG. 4 is a demonstrative illustration of functional block diagram of a reciprocal-type optical digital dispersion compensation module according to yet another embodiment of present invention.

FIG. 4 is a demonstrative illustration of functional block diagram of a reciprocal-type optical digital dispersion compensation module according to yet another embodiment of present invention. More specifically, DDCM 300 illustrated in FIG. 4 may have a configuration similar to that of reflective-type DDCM 200 in that a plurality of dispersion compensation units is connected to a multi-port optical circulator. However, dispersion compensation units 311, 312, 313, and 314 of DDCM 300 are different from that of dispersion compensation units 211, 212, 213, and 214. More specifically, dispersion compensation units 311, 312, 313, and 314 may each contain one dispersion element 321, 322, 323, and 324 respectively, that have two-ports. The two-port dispersion element has reciprocal dispersion characteristics depending on which port an optical signal enters the dispersion element. For example, an optical signal entering into port A3$i$ ($i$=1, 2, 3, and 4) and propagating towards port B3$i$ may get reflected back before reaching port B3$i$ and may experience positive dispersion. Alternately, an optical signal entering into port B3$i$ and propagating towards port A3$i$ may get reflected back before reaching port A3$i$ and may experience negative dispersion. In other words, dispersion element 321, 322, 323, and 324 may serve both as a positive dispersion element and a negative dispersion element depending upon which connection port is used.

According to one embodiment, dispersion element 321, 322, 323, and 324 may be realized or constructed by non-uniform long fiber-Bragg grating (FBG) which has continuous operation bandwidth up to 100 nm. DDCM 300, when one or more of its dispersion element 321, 322, 323, and 324 is made of fiber-Bragg grating, may be able to not only compensate dispersion over a wide continuous bandwidth within a range from 1260 nm to 1680 nm, but also compensate dispersion profile such as slopes of dispersion, whether linear or non-linear, or even derivative of slope of dispersion. As an enabler for current and/or future superchannel transmission of up to 400 Gb/s or even terabit transmission, dispersion slope compensation may be crucial because in this ultra-high data rate transmission, signal distortion may become critically sensitive to high order dispersions such as slope of dispersion ($2^{nd}$ order dispersion), or even derivative of slope of dispersion ($3^{rd}$ order dispersion).

Optical switches 331, 332, 333, and 334 may be one-by-two (1×2) optical switches and may be used to provide access to dispersion elements 321, 322, 323, and 324, respectively and individually, to provide either positive or negative dispersion to an optical signal coming through optical circulator 315 via each optical switches. The optical switches may be electronically controlled such that a fast response time of less than 50 ms, e.g., 10 ms, may be achieved.

Figure 5:
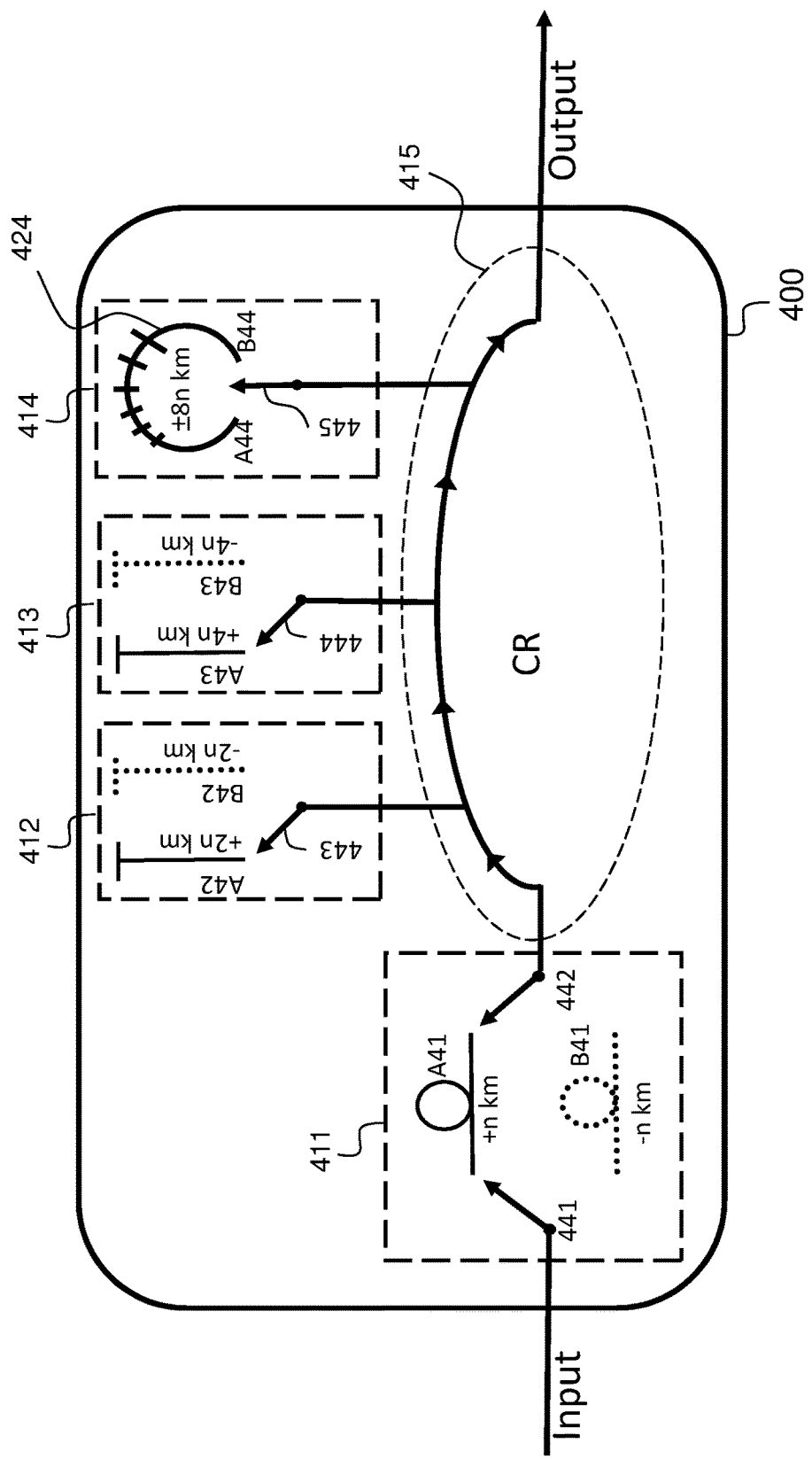
FIG. 5 is a demonstrative illustration of functional block diagram of a hybrid-type optical digital dispersion compensation module according to a further embodiment of present invention.

FIG. 5 is a demonstrative illustration of functional block diagram of a hybrid-type optical digital dispersion compensation module according to a further embodiment of present invention. More specifically, DDCM 400, as being illustrated in FIG. 5, may include one or more dispersion compensation units of various types as those being demonstratively illustrated and discussed above in connection with DDCM 100, 200, and 300 in FIGS. 2, 3, and 4. For example, DDCM 400 may include one transmission-type dispersion compensation unit 411 that has a positive and a negative dispersion element, A41 and B41, and two 1×2 optical switches 441 and 442 at an input port and an output port of DCU 411; two reflective-type dispersion compensation units 412 and 413 that have their respective dispersion elements A42, B42 and A43 and B43; and one reciprocal-type dispersion compensation unit that has only one dispersion element made of FBG having two ports A44 and B44.

In the configuration of FIG. 5, dispersion compensation unit 411 is a transmission-type DCU which usually requires a series connection. Because of this, DCU 411 may be connected either to the input port, as in FIG. 5, or to the output port of optical circulator 415. Two 1×2 optical switches 441 and 442 may provide proper selection of either the positive dispersion element A41 or the negative dispersion element B41. Dispersion compensation units 412 and 413 may be connected to optical circulator 415 through their respective optical switches 443 and 444, which may select either positive dispersion elements A42 and A43 or negative dispersion elements B42 and B43 independently. Dispersion compensation unit 414 may be connected to optical circulator 415 through optical switch 445. Optical switch 445 may select either port A44 or port B44 to connect to dispersion element 424 to realize or achieve either positive or negative dispersion.

In the block diagram of FIG. 5, DDCM 400 is made from a combination of two or more different types of dispersion compensation units and is referred to as a hybrid-type DDCM hereinafter. According to another embodiment of present invention, in consideration of insertion loss of the two additional 1×2 optical switches 441 and 442, in some instances transmission-type dispersion compensation unit 411 may be replaced simply by a piece of optical fiber with a proper length of, for example, less than 5 km.

It is understood that in the demonstrative embodiments described above, and illustrated in FIGS. 2, 3, 4, and 5 respectively, the dispersion compensation units (DCUs) used in the DDCM may provide either a positive or a negative dispersion of equal value, with value being different among different DCUs, which results in a dispersion compensation range of the DDCM from $-(2^N-1) \times n$ km to $+(2^N-1) \times n$ km with an uniform incremental step of $2n$ km, all measured in terms of SMF-28 fiber. However, it is to be understood that absolute dispersion values of the N different DCUs need not to be as described above, i.e., one being twice the value of the other. When the N different DCUs have values in a manner different from what being described above, the DDCM so configured may be able to provide different values of dispersion but with non-uniform intervals or steps.

It is further to be understood that when the positive and negative dispersions provided by a single DCU are designed to take different absolute values, the dispersion compensation range provided by a DDCM so configured may be shifted to either positive or negative value side, and may no longer be symmetric around zero (0) dispersion value. For example, as will be described below in more details, when all of the DCUs used in the configuration of a DDCM are designed to provide either a substantially zero dispersion (e.g., less than that of a 10-meter SMF fiber) or a negative dispersion, depending on the selection made by the optical switch, dispersion compensation range provided by the DDCM may be between zero (0) and a negative value. Likewise, when all of the DCUs used in the configuration of a DDCM are designed to provide either a substantially zero dispersion or a positive dispersion, as decided by the optical switch, dispersion compensation range provided by the DDCM may be between zero (0) and a positive value.

Figure 6D:
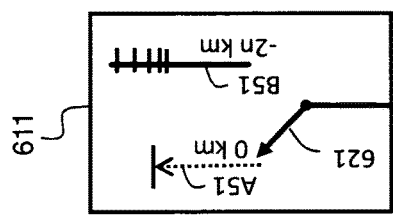
FIGS. 6(a)-(f) are demonstrative illustrations of some reflective-type dispersion compensation units that may be used in an optical digital dispersion compensation module according to further embodiments of present invention.
Figure 6C:
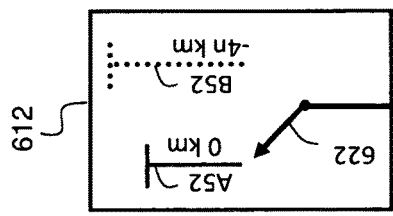
Figure 6F:
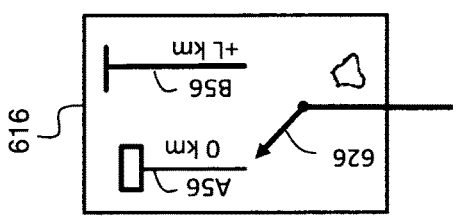
Figure 6B:
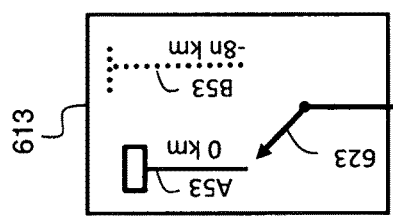
Figure 6E:
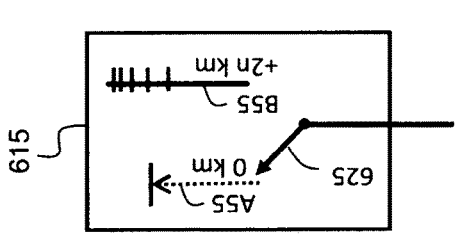
Figure 6A:
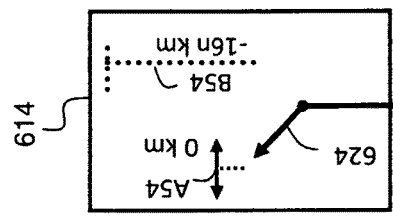

FIGS. 6(a)-(f) are demonstrative illustrations of some reflective-type dispersion compensation units (DCUs) that may be used in an optical digital dispersion compensation module according to further embodiments of present invention. More specifically, FIG. 6(a) illustrates a dispersion compensation unit (DCU) 611 which may be able to provide, via an optical switch 621, either substantially zero dispersion (e.g., less than that of a 10-meter SMF fiber) or a non-zero negative dispersion having a value equivalent to 2n km SMF fiber wherein n may be any value (integer or non-integer value but generally larger than 1). The substantially zero dispersion may be provided by element A51 which may be a piece of reflectively coated metal or mirror, a short piece of fiber (with negligible dispersion) reflectively terminated at one end, a reflective thin-film filter, or other devices that are optically reflective in nature particularly in the wavelength range of an input optical signal. In the meantime, DCU 611 may have a dispersion element B51 providing a non-zero negative dispersion. B51 may be a piece of dispersive fiber of certain length that is reflectively terminated, a fiber-Bragg grating (FBG), or any other dispersive devices currently available or future developed. For example, fiber-Bragg gratings 321, 322, 323, and 324 described above in connection with DDCM 300 in FIG. 4 may be considered as dispersive devices that are reflectively terminated at their port B3$i$ (or A3$i$) as far as the other port A3$i$ (or B3$i$) is concerned. Hereinafter, and as being described above, zero dispersion may not mean a dispersion value of absolute zero. In fact, zero dispersion is used to mean a dispersion of substantially zero value or a dispersion value that is negligibly small (e.g., less than 0.1%) when being compared with that provided by the other dispersive element within the same dispersion compensation unit such as by dispersion element B51 in FIG. 6(a).

FIGS. 6(b), (c), and (d) illustrate, as more non-limiting examples, some other types of DCUs 612, 613, and 614 that are capable of providing either a substantially zero dispersion or negative dispersion of different values via optical switches 622, 623, and 624. Zero dispersion may be provided by elements A52, A53, and A54 that are illustrated in FIGS. 6(b), (c), and (d) respectively to show that they may be the same or different types of reflective devices. Negative dispersions may be provided by elements B52, B53, and B54 that are illustrated respectively to show that they may be different from B51 and may have different values among themselves. For example, DCUs 612, 613, and 614 may be able to selectively provide negative dispersion of values equivalent to 4n km, 8n km, and 16n km of SMF fibers, respectively.

According to one embodiment of present invention, DCUs 611, 612, 613, and 614 may be used to replace or in places of, for example, DCUs 211, 212, 213, and 214 as in FIG. 3 or DCUs 311, 312, 313, and 314 as in FIG. 4. A DDCM so modified from DDCM 200 or DDCM 300 and configured by the use of DCUs 611, 612, 613, and 614 in FIG. 6 may be able to provide a negative dispersion compensation range between about 0 km to about 30n km of SMF fiber, which is a shift of about 15n km toward the negative value side from those provided by DDCM 200 in FIG. 3 and DDCM 300 in FIG. 4. In other words, by applying different dispersion compensation unit that provides two different values of dispersion, a DDCM so configured may be able to provide a different dispersion compensation range according to some embodiments of present invention.

FIGS. 6(e) and (f) illustrate, as more non-limiting examples, DCUs 615 and 616 that may be able to provide a substantially zero dispersion or a positive dispersion of different values. Zero dispersion may be provided by elements A55 and A56, which are illustrated in FIGS. 6(e) and (f) respectively to show that they may be different types of devices such as those being described above. Positive dispersions may be provided by elements B55 and B56 that are illustrated to indicate that they may have different and un-related values. For example, dispersion value of B56, equivalent to +L km SMF fiber, may not be multiple of that of B55 which is illustrated to be equivalent to +2n km SMF fiber. B55 and B56 may be different types of dispersive devices.

A person skilled in art will appreciate that when dispersion compensation units like DCUs 615 and 616, which provides either zero or positive dispersion values via their respective optical switches 625 and 626, are used in configuring a DDCM, the DDCM so configured may provide a dispersion compensation ranging from zero (0) to a positive value.

Figures 7A, 7B:
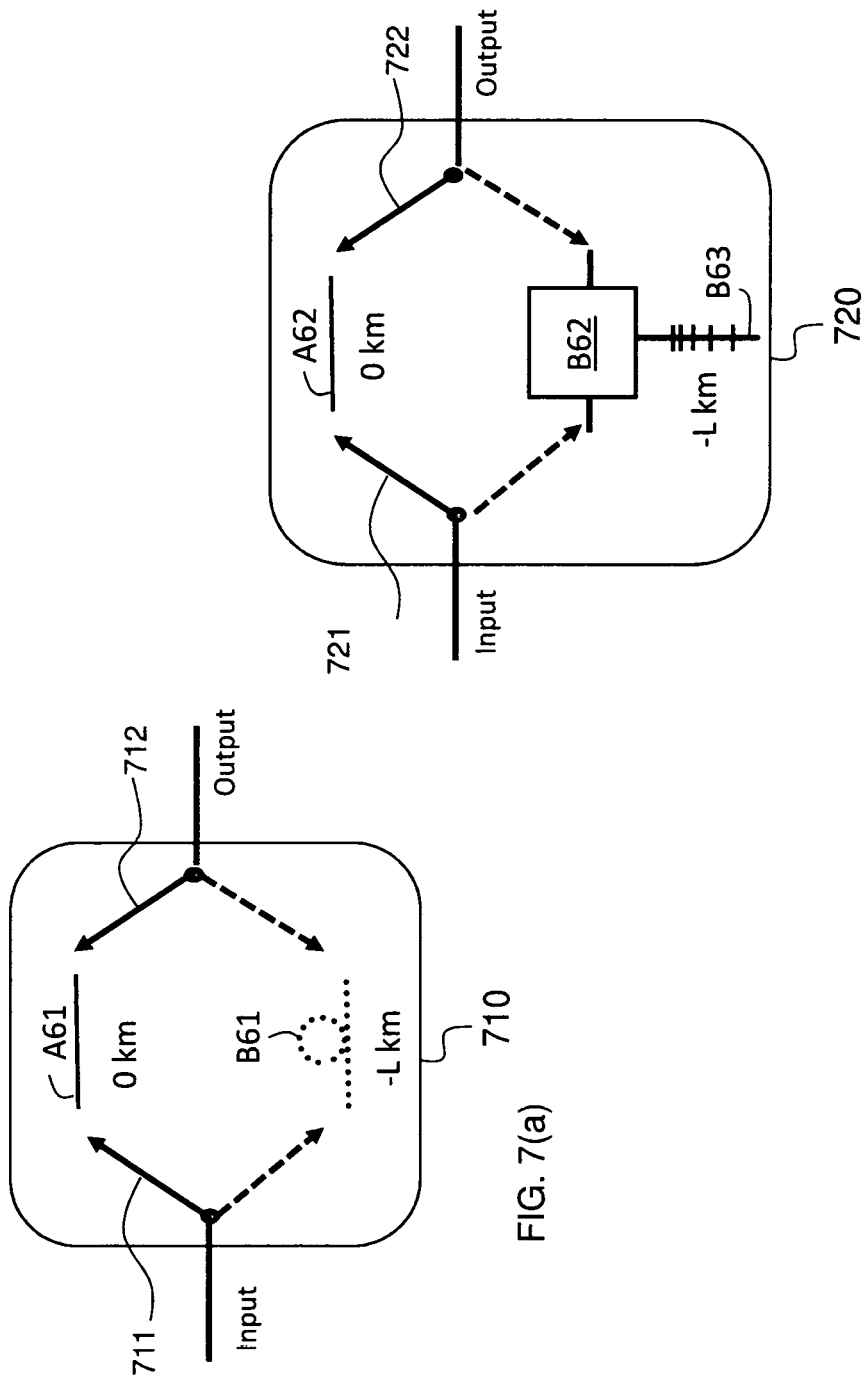
FIGS. 7(a)-(b) are demonstrative illustrations of some transmission-type dispersion compensation units that may be used in an optical digital dispersion compensation module according to further embodiments of present invention.

FIGS. 7(a)-(b) are demonstrative illustrations of some transmission-type dispersion compensation units that may be used in an optical digital dispersion compensation module according to further embodiments of present invention. More specifically, FIG. 7(a) illustrates a DCU 710 that includes a substantially zero dispersion element A61 and a negative, or positive as determined by design, dispersion element B61. DCU 710 further includes an input optical switch 711 which directs an input optical signal to either A61 or B61, and an output optical switch 712 which passes the optical signal, coming via either A61 or B61, to an output port of the DCU 711. Input optical switch 711 and output optical switch 712 may be 1×2 optical switches, or may together be a 2×2 optical switch or switch element. DCU 710 is generally referred to herein as a transmission-type DCU where an optical signal passes through from an input port to an output port.

FIG. 7(b) illustrates a DCU 720 that is configured in a similar way to that of DCU 710. Specifically, DCU 710 includes a zero or substantially zero dispersion element A62 and a dispersive (negative or positive) element that may be a reflective fiber-Bragg grating or a piece of reflectively terminated fiber B63 being connected to an optical circulator B62. Optical circulator B62 may be connected to an input optical switch 721 and an output optical switch 722. DCUs 710 and 720 may be used, for example, in a DDCM configuration such as DDCM 400 in FIG. 5 to replace DCU 411. Optical switches 721 and 722 may be 1×2 optical switches or may be together replaced by a 2×2 optical switch.

Figure 8:
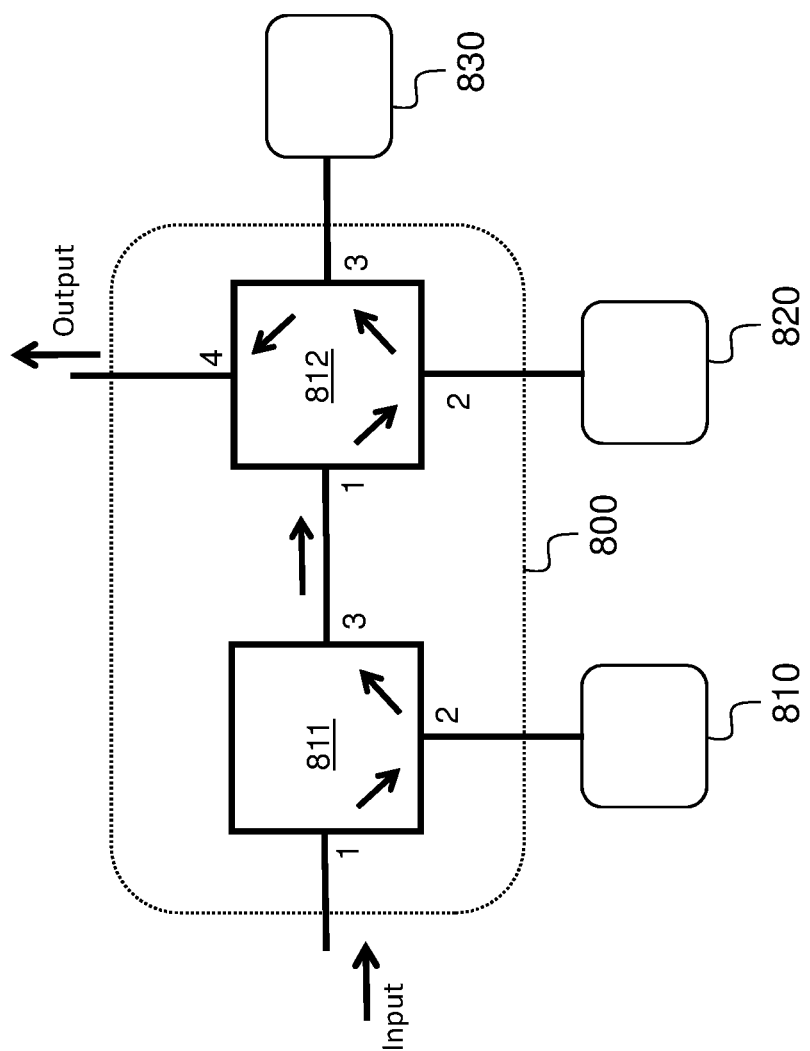
FIG. 8 is a demonstrative illustration of a functional block diagram of an optical digital dispersion compensation module using cascaded optical circulators according to an embodiment of present invention.

FIG. 8 is a demonstrative illustration of a functional block diagram of an optical digital dispersion compensation module using cascaded optical circulators according to an embodiment of present invention. In particular, a high-number multi-port optical circulator may be configured or achieved by cascading two or more low-number multi-port optical circulators. For example, as being illustrated in FIG. 8, a 5-port optical circulator may be created by connecting the $3^{rd}$ port of a 3-port optical circulator 811 with the $1^{st}$ port of a 4-port optical circulator 812. Remaining ports of optical circulators 811 and 812 may be used to connect to dispersion compensation units such as DCUs 810, 820 and 830 to create a DDCM 800. DCUs 810, 820, and 830 may each provide two different dispersion values selectively such as, for example, a positive and a negative value, a substantially zero and a negative value, or a substantially zero and a positive value, and such value may be achieved via an internal optical switch with the DCU. A DDCM so configured may be able to provide dispersion compensation in a wide range.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A digital dispersion compensation module (DDCM) comprising:
    a multi-port optical circulator; and
    a plurality of dispersion compensation units connected to said multi-port optical circulator,
    wherein at least one of said plurality of dispersion compensation units comprises:
        a first and a second reflectively terminated element; and
        an optical switch being capable of selectively connecting to one of said first and second reflectively terminated elements,
    and wherein said at least one of said plurality of dispersion compensation units is adapted to provide a substantially zero dispersion to an optical signal, coming from said multi-port optical circulator, when said optical switch connects to said first reflectively terminated element and is adapted to provide a non-zero dispersion to said optical signal when said optical switch connects to said second reflectively terminated element.

2. The DDCM of claim 1, wherein each of said plurality of dispersion compensation units is configurable to selectively provide said substantially zero dispersion or said non-zero dispersion within 50 ms, with value of said non-zero dispersion provided by each of said plurality of dispersion compensation units being different.

3. The DDCM of claim 2, wherein value of said non-zero dispersion provided by each of said plurality of dispersion compensation units, except a minimum value one thereof, is twice of value of said non-zero dispersion provided by another dispersion compensation unit of said plurality of dispersion compensation units.

4. The DDCM of claim 3, wherein said non-zero dispersion is a positive dispersion.

5. The DDCM of claim 3, wherein said non-zero dispersion is a negative dispersion.

6. The DDCM of claim 1, wherein at least one of said plurality of dispersion compensation units is a transmission-type dispersion compensation unit having a first port and a second port, with one of said first and second ports being an input port or an output port of said DDCM.

7. The DDCM of claim 1, wherein said first reflectively terminated element is selected from a group consisting of a reflectively coated mirror, a reflective thin-film filter, and a piece of fiber reflectively terminated at one end.

8. The DDCM of claim 1, wherein said second reflectively terminated element is a dispersive fiber of certain length being reflectively coated at one end or a reflective fiber-Bragg grating, being capable of providing said non-zero dispersion to said optical signal over a continuous bandwidth of at least 35 nm in either a C-band of 1530-1565 nm or a L-band of 1565-1625 nm of optical signal spectrum.

9. A digital dispersion compensation module (DDCM) comprising:
    a multi-port optical circulator; and
    a plurality of dispersion compensation units connected to said multi-port optical circulator,
    wherein at least one of said plurality of dispersion compensation units is capable of selectively providing a substantially zero dispersion or a non-zero dispersion to an optical signal going through said multi-port optical circulator and comprises:
        a first and a second reflectively terminated element; and
        an optical switch element being capable of selectively and within 50 ms connecting to said first reflectively terminated element to provide said substantially zero dispersion or connecting to said second reflectively terminated element to provide said non-zero dispersion.

10. The DDCM of claim 9, wherein said second reflectively terminated element is a fiber-Bragg grating capable of providing said non-zero dispersion to said optical signal over a continuous bandwidth of at least 35 nm either in a C-band of 1530-1565 nm or in a L-band of 1565-1625 nm of optical signal spectrum.

11. The DDCM of claim 9, wherein said non-zero dispersion is a negative dispersion and wherein each of said plurality of dispersion compensation units is configurable to selectively provide said substantially zero or said negative dispersion to said optical signal within 50 ms, with value of said negative dispersion provided by each of said plurality of dispersion compensation units, except a minimum value one thereof, is twice of value of said negative dispersion provided by another dispersion compensation unit of said plurality of dispersion compensation units.

12. The DDCM of claim 9, wherein said non-zero dispersion is a positive dispersion and wherein each of said plurality of dispersion compensation units is configurable to selectively provide said substantially zero or said positive dispersion to said optical signal within 50 ms, with value of said positive dispersion provided by each of said plurality of dispersion compensation units, except a minimum value one thereof, is twice of value of said positive dispersion provided by another dispersion compensation unit of said plurality of dispersion compensation units.

13. The DDCM of claim 9, wherein said second reflectively terminated element is a piece of dispersive fiber of certain length having a first end and a reflectively terminated second end, and is capable of providing said non-zero dispersion to said optical signal entering at said first end.

14. The DDCM of claim 9, wherein said at least one of said plurality of dispersion compensation units is a transmission-type dispersion compensation unit having a first port and a second port, and is capable of selectively providing said substantially zero dispersion or said non-zero dispersion to said optical signal going through thereof from said first port to said second port.

* * * * *